Patented Mar. 6, 1945

2,371,087

UNITED STATES PATENT OFFICE 2,371,087

CATALYTIC DEHYDROGENATION PROCESS

Glenn M. Webb and Marvin A. Smith, Chicago, Ill., ass'gnors to Universal Oil Products Company, Chicago, Ill., a corporation of Delaware No Drawing. Application March 27, 1942, Serial No. 436,506

16 Claims. (Cl. 260—680)

This invention relates to a process for the dehydrogenation of organic compounds including hydrocarbons. More specifically, it is concerned with a process for dehydrogenating organic compounds by means of a highly active specially prepared alumina-containing catalyst.

The catalytic dehydrogenation of organic compounds, particularly of hydrocarbons, has developed into an extensive art that includes reforming of straight run gasolines; dehydrogenation of aliphatic hydrocarbons; aromatization of hydrocarbons containing 6 or more carbon atoms in a straight chain arrangement, or 6 carbon atoms in a cyclic arrangement; dehydrogenation of alkyl groups attached to aromatic nuclei; and the like.

In such processes a wide variety of catalysts have been used, some of which have shown a high initial activity but none of which have been entirely satisfactory as far as catalyst life is concerned. For this reason, the quest for new catalysts and for new methods of preparation of catalysts which will result in the formation of catalytic masses having not only a high initial activity but also a high thermal stability and a resultant long life, has been continuous. Generally speaking, catalysts containing alumina have been found to be the most satisfactory.

We have found that in performing dehydrogenation reactions, alumina-containing catalysts prepared in a particular manner hereinafter described are generally superior to other conventionally prepared alumina-containing dehydrogenation catalysts or other types of dehydrogenation catalysts that have been heretofore reported. Moreover, the manufacture of our catalyst is simple and economically practical.

In general, dehydrogenation reactions of organic compounds in accordance with the present invention are effected with the aid of catalysts prepared by forming a solution containing an aluminum salt and a compound constituting the source of another catalytic substance to be associated with alumina in the final catalyst, converting at least a major portion of the aluminum salt into hydrated aluminum oxide under conditions such that the compound of the other catalytic substance is maintained in soluble form, evaporating solvent from the mixture and heating the residue under conditions such that volatilizable impurities are substantially removed.

In one specific embodiment the present invention comprises contacting a dehydrogenateable organic compound under dehydrogenation conditions with a catalytic composite comprising an association of alumina and at least one other catalytically active substance, said composite being prepared by forming a solution containing an aluminum salt and a compound constituting the source of said other catalytic substance, converting at least a major portion of the aluminum salt into hydrated aluminum oxide under conditions such that said compound is maintained in soluble form, evaporating solvent from the mixture and heating the residue under conditions such that volatile impurities are substantially removed and the catalytic properties of the composite are developed, and thereafter recovering the products of dehydrogenation.

The catalysts heretofore employed for dehydrogenation reactions have been prepared by a variety of methods. For example, impregnation of prepared granular alumina with solutions of compounds yielding catalytically active oxide components, followed by chemical or thermal decomposition of the added compound to form the final composite, is a standard method of preparation. Another example of a widely used method of preparation of dehydrogenating catalysts is known as the co-precipitation method, practiced either by causing reaction between two electrolytes of different charge so as to simultaneously precipitate hydrated alumina and at least one other hydrate, or by forming a solution of an aluminum compound and a compound capable of yielding catalytically active oxides and adding a common precipitant to this solution so as to simultaneously precipitate the hydrates of alumina and the other catalytically active oxide; the resultant co-precipitated mass is then dried, usually after washing, and transformed into the desired catalyst composite. A third method of preparation which has been used extensively involves the successive precipitation of alumina and the hydrate of a catalytically active oxide, or the precipitation of the hydrate of a catalytically active oxide on suspended granular alumina.

In contradistinction to the catalysts resulting from these known methods, the catalyst employed according to the invention is distinguished by an improved structure resulting from the manner of its manufacture. Thus an important advantage lies in the fact that our novel catalysts are characterized by a more even distribution of the non-aluminiferous compound and of the alumina throughout the body of the composite so that the catalytic surfaces are much more uniform than in the case of the more conventional types of catalysts.

In general, the present process possesses the following advantages over heretofore known processes of similar import:

1. Higher ultimate conversion to the desired product at a given set of operating conditions.
2. Higher conversion per pass, which will result in a lower recycle ratio of unconverted material when a recycle operation is employed.
3. Higher ultimate recovery of desirable dehydrogenation products resulting from decreased undesirable side reactions.
4. Lower carbon formation reducing the requirements for facilities of regeneration.
5. Higher conversion capacity for a plant of given catalyst capacity.
6. An improved quality of the reaction product in many cases.

It is apparent from the above advantages that our process constitutes a meritorious contribution in the art of dehydrogenation, extending from the initial cost of installing the plant through the operating costs and to the quality of the products produced.

In the manufacture of the catalyst employed in the present process the hydrated aluminum oxide is precipitated from a solution of an aluminum salt of a volatilizable acid. Such salts may include salts of hydrochloric acid, hydrobromic acid, hydrofluoric acid, sulfuric acid, carbonic acid, nitric acid, acetic acid, oxalic acid and other acids which yield soluble aluminum salts. Aqueous solutions of aluminum salts are generally preferable. It is comprised within the scope of the catalyst manufacture to employ solutions of aluminum salts in other types of solvents which are substantially inert or non-reactive with aluminum salts or other ingredients to be used in the preparation of the catalyst composites as described hereinafter. By inert or non-reactive, it is meant that the solvent shall not cause transformation of the ingredients into an undesirable form, or shall not bring about an undesirable precipitation of the non-alumina ingredient. Mixtures of aqueous and non-aqueous solvents may be used in certain instances where the non-alumina substance is not sufficiently soluble in water.

The volatilizable basic precipitants used in the catalyst preparation include generally ammonium compounds having a basic reaction such as, for example, ammonium hydroxide, ammonium carbonate, etc.; also substituted ammonium compounds such as amines or nitrogen bases generally insofar as the compounds formed between these substances and the volatilizable acids in association with aluminum are sufficiently volatilizable and leave no undesirable residues upon subsequent decomposition or volatilization. It is preferable that the salt formed between the volatilizable basic precipitant and the acid radical be soluble in the solvent employed so that the only material not in solution is the alumina hydrogel or hydrosol.

The hydrated aluminum oxide may be precipitated by a volatilizable basic precipitant in a solution of a compound yielding a catalytically active oxide or other substance on subsequent evaporation of the solvent, without substantial precipitation of this compound during the precipitation of the hydrated aluminum oxide.

Ordinarily in the catalyst manufacture it is necessary to add a sufficient quantity of the precipitant to bring the pH to a value of at least about 4 to effect precipitation of a major portion of the hydrated alumina. In order to effect substantially complete precipitation of the hydrated alumina it may be necessary to go to higher pH values even to the point of having the solution decidedly basic. The exact pH chosen in the preparation of any particular catalyst will depend on the concentration of the aluminum salt solution and upon the characteristics of the other ingredients present at this stage of the catalyst preparation. In certain instances these non-aluminiferous ingredients may be soluble in either acidic or basic solution. However, some compounds may be sufficiently soluble only if the system is maintained on the acid side, while in other cases it is necessary to maintain the solution distinctly on the basic side in order to prevent undesirable co-precipitation of the non-aluminiferous ingredient together with the hydrated alumina. Some ingredients may be soluble at substantially the neutral point while others may precipitate at this point but remain soluble in basic or acidic solution. Only such compounds as are soluble in water and/or other solvent in the presence of the volatilizable precipitant and the hydrated alumina should be employed since if precipitation of the compound to be associated, or co-precipitation occurs, the improvements will not be fully realized. This limits the compounds that may be added. In some instances there is a possibility of reaction between the alumina and the other compound. This does not mean that the aluminum salt and the non-aluminiferous salt have co-precipitated, but merely that some physical-chemical interaction such as adsorption by the hydrated alumina may have taken place. We do not, however, intend to be bound unduly by any such explanation.

In certain cases wherein the added compound is sufficiently soluble only at a pH of less than 7; or where it is desired to carry out the precipitation of alumina hydrate in a slightly acid system it may be that the pH will be inadvertently carried too high. It may be adjusted by adding a small amount of an acid or of an aluminum salt to the system. This makes the operation somewhat more flexible in that no great harm is done at this stage if optimum conditions are not attained the first time.

In certain cases it may be desirable to precipitate the alumina substantially completely by carrying the pH over to the basic side and thereafter bring the pH back to the acid side, possibly to the extent of forming a hydrosol, by the addition of an appropriate acid, for example, acetic acid or hydrochloric acid. Such a procedure may be followed especially when the compound constituting the source of the non-aluminiferous catalytic substance is soluble in either basic or acidic solution. Thus, for example, one may make a solution of aluminum chloride and ammonium molybdate. A sufficient quantity of ammonium hydroxide may be added to bring the pH to about 8 thereby completely precipitating the alumina as hydrated aluminum oxide. If the original solution were sufficiently dilute, the hydrated aluminum oxide may at this point be in highly dispersed form and the mixture may be evaporated and calcined. However, if a comparatively concentrated solution of the aluminum salt is used originally, the hydrated alumina may coagulate and form a more or less rigid gel or particles of gel, which tend to separate upon standing. Although the ammonium molybdate is still in soluble form, the final mixture upon evaporation may not be uniform. To overcome the tendency toward non-uniformity, acetic acid, for example, may be added until the pH is on the acid side and part of the alumina is converted into a hydrosol whereby upon subsequent evaporation a uniform composite results.

In the succeeding step of the catalyst manufacture, the suspension of hydrated aluminum oxide in the solution containing non-aluminiferous compound (as well as salts of the basic precipitant and the acid radical of the aluminum salt) is heated to drive off water (or other solvent if one is used) and leave a residual relatively dry, solid material.

In the next step the residual mass is heated at higher temperatures generally not exceeding 900° C. to remove by volatilization or decomposition the reaction products resulting from the precipitation of hydrated aluminum oxide; to drive off the remaining free water and at least a part of the bound water; and to develop the catalytic properties of the composite. This may involve, in part, decomposition of the non-aluminiferous compound present into the oxide or other substance which is to be present in the final catalyst composite. When ammonium compounds have been used as the precipitants for the hydrated alumina in the primary stage of the catalyst preparation, the materials volatilized will be ammonium salts. For example, if ammonium hydroxide has been added to a solution of aluminum chloride the principal material volatilized in the final heating stage will be ammonium chloride. If volatile organic acids such as acetic acid have been present, or aluminum acetate were used in the preparation, some carbon may be present in the dry, solid mass due to decomposition of the organic material. In such a case it is desirable to carry out the final heating step in the presence of an oxygen-containing gas to burn out the carbon.

Ordinarily, calcination temperatures below approximately 900° C. are employed in the final heating step. The exact temperature and time of heating used for any given catalyst preparation is dependent to a large extent upon the volatilization temperature of the salt of the basic precipitant; the use to which the catalyst is to be put; and upon other factors such as the decomposition temperature of the non-aluminiferous compound to yield the associated catalytic oxide or substance. In many of these preparations, care must be taken to avoid overheating of the composite. Thus, when preparing catalysts for the dehydrogenation of dehydrogenatable organic compounds, temperatures in excess of about 900° C. should be avoided, and if the heating is carried out at such a temperature, the time of heating should be limited so that substantially no loss in catalytic activity occurs due to overheating. The correlation of time and temperature is always an important consideration in calcining catalysts, particularly when temperatures of the order of 700° C., or higher, are used. It is a feature of any of the catalysts used in the process of the present invention that they withstand higher temperatures for longer times than catalysts of similar composition prepared by hitherto known methods. It is an advantage of the process that there is less likelihood of ruining the catalyst because of inadvertent overheating. In general, heating conditions which result in the transformation of alumina to the alpha alumina form are to be avoided.

The final catalyst composite, after the calcination step, may be comminuted for use in powdered condition or it may be formed into various shapes by compression or extrusion methods. In forming pelleted catalyst from the catalytic material after the volatilization of the salts in the final step of preparation, the solid residue may be ground to a desired size and a small percentage of lubricating material such as rosin or fatty substances may be added to facilitate pilling in standard type of machines. Usually such pellets are later calcined at sufficiently elevated temperatures to remove the lubricant. In another type of forming process, finely divided catalytic material may be wetted and the particles formed by extrusion method with or without addition of lubricants or binders. As a further variation certain of the dried composites may be formed into shapes after drying, and the calcination step may then be carried out on the preformed particles.

It is also within the scope of this invention to employ catalysts containing more than one added catalytic substance associated with the alumina in the final composite. A few examples of such multicomponent catalysts are composites of alumina-molybdena-magnesia, alumina-chromia-magnesia, alumina-molybdena-zinc oxide or alumina-molybdena-titania composites.

Typical catalysts which can be used with varying degrees of effectiveness in the present process include the association of alumina with one or more of the various difficultly reducible metal oxides. A group which includes oxides of particularly desirable characteristics for this purpose are those difficultly reducible metal oxides which readily undergo a valence change. By the term "difficultly reducible metal oxides," we mean those metal oxides other than alumina which are not readily reduced to the metallic form under conditions prevailing in the processes in which they are used.

A particularly useful group of compounds are oxides of elements appearing in the left hand column of group VI of the periodic table generally and particularly oxides of chromium, molybdenum and tungsten. Another classification of compounds which may be used as components of the dehydrogenating catalysts is oxides of elements appearing in the right hand column of group II including magnesium, zinc, and cadmium. A further class of materials are the oxides of elements appearing in the left hand column of group V, particularly vanadium, columbium, and tantalum. Another group includes the elements appearing in the left hand column of group IV, particularly cerium, thorium, zirconium, and titanium.

Of all these elements falling within one or more of the above classifications, the most generally applicable to dehydrogenation reactions including reforming of gasolines, are oxides of molybdenum, chromium, vanadium, cerium, tungsten, zinc, and magnesium. The catalyst composites of the character just described are particularly useful in the dehydrogenation of aliphatic hydrocarbons to produce aliphatic hydrocarbons containing a corresponding number of carbon atoms such as the dehydrogenation of butane to butylene and butadiene and the like. They may also be used for the dehydrogenation of naphthenes to produce aromatics. Likewise, these composites may be used to advantage for the cyclization of straight chain aliphatic hydrocarbons containing at least 6 carbon atoms.

When dehydrogenating naphthenes a further class of catalysts may be used which comprise elements or compounds of elements of group VIII of the periodic table such as iron, nickel, cobalt, platinum and palladium.

In operating according to the process of this invention, the organic reactants which are to be dehydrogenated are usually heated to the desired conversion temperature and then contacted with the dehydrogenation catalyst. The catalyst may be either in the form of a powder or in the form of granules or shaped particles depending upon the type of operating procedure to be used. A convenient method of dehydrogenating the organic compounds is to pass the vaporous compounds at a conversion temperature through a stationary bed of catalyst particles at such a rate that the desired extent of conversion is effected. According to another method of operation, the powdered catalyst may be added to a flowing stream of the vaporous organic compounds and maintained in suspension in that stream for a sufficient length of time to dehydrogenate to the desired extent. In a modification of this last mentioned operation, a gaseous stream of vaporized charging material is bubbled upward through a turbulent bed of powdered dehydrogenating catalyst. In this modification, the flow of the charging material may be intermittent so that regeneration may be effected at intervals, or the catalyst may be continuously added to and withdrawn from the reaction zone and regenerated with an oxygen-containing gas in a separate zone. In the stationary bed operation previously mentioned, regeneration is usually accomplished intermittently.

The conditions of operation in the dehydrogenation step depend to a large extent upon the type of catalyst that is used, upon the material being dehydrogenated, upon the extent of dehydrogenation that is desired, and upon various other factors. Generally speaking, in the case of reforming gasoline fractions or naphthas in the presence of hydrogen, i. e. in so-called "hydroforming," temperatures in the range of from 450 to 700° C.; pressures in the range of from atmospheric to 40 atmospheres or more; liquid hourly space velocities usually below about 10 and preferably in the range of from .1 to 5; and molal ratios of hydrogen to charging material in the range of .2 to 8 are usually employed. In general, relatively high space velocities are used at relatively high temperatures within the ranges indicated, and at any given temperature a relatively high space velocity may be used with a relatively high pressure. In this process, any hydrogen-containing gas (oxygen free), preferably one predominantly hydrogen, may be employed. Since a net production of hydrogen results from the "hydroforming" process, a part of the process gases may be recycled.

By the term "liquid hourly space velocity" as herein used we mean the volumes of hydrocarbon measured as liquid at normal temperature, per bulk volume of granular catalyst per hour.

The term "gas hourly space velocity" as used herein refers to the volumes of hydrocarbon measured as a gas at standard conditions of temperature and pressure, per bulk volume of granular catalyst per hour.

If the reaction is carried out in the presence of powdered catalyst moving through a reaction zone, the ratio of catalyst to hydrocarbon may be expressed in appropriate terms corresponding to the conditions expressed by these definitions.

In the case of catalytic reforming wherein hydrogen is not used the operating conditions may otherwise be substantially the same as in the "hydroforming" process.

In aromatizing a hydrocarbon consisting of or containing aliphatic hydrocarbons having 6 or more carbon atoms per molecule, the operating conditions may be as follows: temperatures in the approximate range of from 450–700° C.; pressures varying from atmospheric to 10 atmospheres or more, and liquid space velocities usually less than about 10 and preferably ranging from about 0.1 to 5. In this type of operation it may in some case be desirable to supply or recirculate hydrogen or hydrogen-containing gas to the reaction zone.

In the dehydrogenation of naphthenes containing 6 carbon atoms in a ring, temperatures ranging from 250° C. to 650° C., liquid space velocities in the range of from about 0.1 to about 20, and pressures ranging from atmospheric to 10 atmospheres or higher may be used. Usually, the charging materials for aromatization processes are stocks which consist not only of straight chain aliphatic hydrocarbons but also of naphthenes containing 6 carbon atoms in a ring. For this reason, when operating on a charge containing both aliphatic hydrocarbons and naphthenes, conditions for the aromatization of the aliphatic hydrocarbons are employed, if it is desired to form aromatics from the aliphatics as well as from the naphthenes.

In dehydrogenating aliphatic hydrocarbons into corresponding less saturated aliphatic hydrocarbons such as dehydrogenating paraffins to form olefins; mono-olefins to form diolefins; and the like, the conditions which are employed will depend to a large extent upon the charging material. For example, in the dehydrogenation of butane to form butenes, temperatures ranging approximately from 450 to 700° C.; gaseous space velocities ranging from 200 to 5000; and pressures ranging from subatmospheric to about 10 atmospheres are usually used.

In dehydrogenating butane or butene or butane-butene mixtures to butadiene, the temperatures may range from 450 to 700° C., the gas space velocities from 200–3000, and the pressure, atmospheric, but preferably substantially subatmospheric. The partial pressure of the $C_4$ hydrocarbons is usually kept below 300 mm. mercury absolute, preferably between 15 and 250 mm. mercury absolute, in order to prevent undue decomposition of the butadiene. The partial pressure of the hydrocarbon may be reduced by use of steam or other inert gases in some cases.

In the dehydrogenation of ethylbenzene to form styrene, the temperatures may range from 450–700° C., and the liquid space velocities from 0.1 to 5. Low pressures are preferred, ranging from 0.1 to 2 atmospheres. In this case the partial pressure of the ethylbenzene may be reduced by steam or other inert gas.

In general when dehydrogenating organic compounds according to the present invention, temperatures and pressures to be employed may be of the order of those heretofore employed in like reactions.

The following are specific examples of the preparation of catalysts and their use in specific embodiments of the present process.

EXAMPLE I

Hydroforming of low octane number gasolines according to the invention using an alumina-molybdena composite as catalyst prepared in accordance with our preferred method is considered in comparison with the use of catalysts prepared by the conventional procedure of impregnating prepared granules of alumina with compounds yielding molybdenum oxides.

In the preparation of the presently preferred type of catalyst aluminum chloride hexahydrate is dissolved in water, one liter of water being used per gram mole of the compound $AlCl_3 \cdot 6H_2O$. To such a solution an amount of ammonium molybdate is added so that in the finally prepared catalyst there is a weight percentage of molybdenum oxides calculated as $MoO_3$ equal to about 7 per cent of the total composite. During thorough agitation of the solution varying amounts of ammonium hydroxide may be added to produce different pH values corresponding to the precipitation of substantially all of the dissolved aluminum salt as hydrated aluminum oxide. The suspension of hydrated aluminum oxide in the ammonium molybdate solution is then heated to drive off water and produce a residual solid mass which in each case is then heated to a temperature of about 370° C. to about 400° C., ground to pass a 30 mesh sieve, mixed with 4 per cent by weight of rosin and formed into ⅛" by ⅛" pellets. To free the pellets of rosin and a major portion of the combined water, they are heated in the presence of air at about 600° C. for about two hours and then at about 750° C. for approximately 6 hours.

The catalyst thus prepared is compared with another catalyst manufactured in substantially identical manner except that no ammonium hydroxide is added during the preparation. The catalyst is further compared with one made by impregnating ⅛" by ⅛" pellets of an Activated Alumina of commerce with ammonium molybdate solution followed by drying and calcining under substantially the conditions used above. The concentration of molybdenum oxides in the calcined composite correspond to that of the other two catalysts. The catalyst is typical of those used in commercial hydroforming operations except that it is calcined at a higher temperature than is ordinarily used.

Experience has shown that the behavior of catalysts calcined at 750° C. for 6 hours and then tested for activity under the conditions shown is a qualitative evaluation of the ability of the catalysts to stand up under long periods of operation. No absolute correlation between the test and the life of the catalyst has been worked out, but experience has shown that the catalyst having the higher activity after such calcination is superior for commercial purposes.

Catalysts prepared in the manner described are tested for hydroforming activity in the treatment of a Mid-Continent naphtha fraction boiling from 103–207° C. and having an A. S. T. M. octane number of 35. The prepared catalyst pellets are placed in tubular reactors, and the vapors of the naphtha mixed with about 4.5 moles of hydrogen per average mole of naphtha are passed through the catalyst at a temperature of about 505° C. at a pressure of 7 atmospheres, and a liquid hourly space velocity of 0.5.

The results are shown in Table I.

Table I

Comparative data on alumina-molybdena catalysts in hydroforming

|  | Run No. | | | | | |
| --- | --- | --- | --- | --- | --- | --- |
|  | 1 | 2 | 3 | 4 | 5 | 6 |
| Precipitant | None | $NH_4OH$ | $NH_4OH$ | $(NH_4)_2CO_3$ | $(NH_4)_2CO_3$ | Impregnated catalyst |
| Final pH value | 1.8 | 4.9 | 8.5 | 5.0 | 7.8 |  |
| Calcining temp., °C | 750 | 750 | 750 | 750 | 750 | 750 |
| Yield of gasoline, volume per cent | 82.0 | 71.4 | 63.6 | 69.6 | 68.0 | 90.0 |
| Octane No. of 10 pound R. V. P.[1] gasoline | 76.9 | 84.5 | 88.3 | 87.0 | 86.6 | 59.0 |
| Carbon, wt. per cent | 0.30 | 0.88 | 0.94 | 1.33 | 0.71 | 0.14 |

[1] Reid vapor pressure.

The catalysts made by the present process are more active than catalyst of the same chemical composition made by evaporating solutions of salts of the components and calcining the residue, or by the conventional impregnation process. This fact is evidenced by the higher octane numbers of the reformed gasoline.

The data establish the superiority of the process of this invention.

To further establish the superiority of our preferred operation, our catalyst is compared with the impregnated catalyst calcined at 600° C. for 6 hours. Under these conditions the maximum activity of the impregnated catalyst is developed. The results are shown in Table II.

Table II

|  | Run No. | |
| --- | --- | --- |
|  | 8 | 9 |
|  | Catalyst | |
|  | Improved $Al_2O_3$-$MoO_3$ | Impregnated $Al_2O_3$-$MoO_3$ |
| Calcination temp., °C | 750 | 600 |
| Processing temp., °C | 500 | 500 |
| Liquid hourly space velocity | 1 | 0.5 |
| Yield: Gasoline, volume percent | 80.5 | 79.1 |
| Carbon, wt. percent | 0.44 | 0.76 |
| A. S. T. M. octane No | 80.5 | 78.7 |

By our process it becomes possible to employ double the space velocity (half the contact time) and produce a higher yield of higher octane number gasoline. Moreover, less carbon is formed than is the case with the impregnated catalyst.

From these data it would appear that by operating according to the invention instead of with the conventional impregnated catalyst, a plant of given catalyst capacity would be doubled in reforming capacity while producing a better quality product. Actually this is not the only benefit realized. Because of lower carbon formation, the requirements for regeneration facilities in connection with the reforming plant are materially reduced; less of the charging stock is lost through carbon formation; less time is required for regeneration and conversely, more time is available for processing; fewer and less severe regenerations are required which is a factor favoring economy and longer catalyst life. In addition to the fact that the catalyst activity is maintained over longer periods of use, higher octane numbers may be obtained with our catalyst than is the case with catalysts produced by the impregnation method.

EXAMPLE II

The following illustrates hydroforming with catalysts consisting of associations of alumina and vanadia in our process as compared to the use of catalysts of similar chemical composition but made by impregnating activated alumina. The alumina-vanadia catalyst is made by preparing an ammoniacal solution of ammonium vanadate and adding it to a solution of aluminum chloride. The amount of ammonia added is such that a major proportion of the aluminum precipitates as hydrated aluminum oxide while the vanadium compound remains in soluble form. After evaporating the solvent, the residual material is heated at 600° C. to produce a composite containing 5 per cent by weight of vanadium oxides calculated as $V_2O_5$.

Impregnated catalyst for comparison is made by adding aqueous ammonium vanadate solution to commercial Activated Alumina similar to that used in Example I, and calcining at 600° C.

The hydroforming of a Mid-Continent naphtha with these catalysts is carried out at 525° C.; liquid space velocity 0.75; 6 mol hydrogen (based on the hydrogen content of recycled process gas) per mol of gasoline; and pressure of 20 atmospheres. Our process yields about 75 per cent of 85 octane number gasoline. The use of the impregnated catalyst yields 76 per cent of 80 octane number gasoline. The weight percentages of carbon on the catalysts are 0.9 per cent and 1.0 per cent respectively.

EXAMPLE III

Dehydrogenation of butane and butylene to butadiene is carried out by our process. In order to operate at a reasonably low effective temperature and at a pressure not lower than is necessary and consistent with good conversion a catalyst of high activity and low carbon forming tendency is used. Catalysts suitable for this purpose include alumina associated with molybdena, chromia, vanadia, and ceria. These may be associated with oxides of zinc or magnesium. The relative proportions of alumina and the added oxide or oxides depend to a large extent upon which catalytic substance is employed. Ordinarily the alumina comprises the major constituent. Smaller amounts of molybdena are preferred than is the case with chromia. The amount of chromia is usually from about 2 to about 40 per cent, while as a rule the best results are obtained with less than 10 per cent molybdena in the composite catalyst.

In Table III are shown comparative results employing impregnated catalysts and those preferred in the process of our invention.

The impregnated catalysts are made according to the general procedure of soaking Activated Alumina in a solution of a compound of the added substance, drying and calcining. Thus, the catalyst in run #10 is prepared from Activated Alumina, chromic acid, and magnesium chromate. The alumina-molybdena catalyst of run #11 is prepared by soaking Activated Alumina with ammonium molybdate solution. The magnesia is added to the chromia-alumina catalyst because it tends to stabilize the catalyst against loss of activity at high temperatures, although this catalyst is of about the same activity initially whether magnesia is present or not.

The improved alumina-molybdena catalyst used in accordance with the invention in run #13 is prepared as outlined in Example I. The improved alumina-chromia catalyst employed according to the invention in run #12 is prepared by forming a solution of aluminum chloride and chromium nitrate. Thereafter sufficient quantity of ammonium hydroxide is added to precipitate a major proportion of the alumina without, however, rendering the chromium compound insoluble. The mixture is then evaporated to substantial dryness and calcined at a temperature of about 700° C. for 6 hours. The results of dehydrogenating a butane-butene mixture containing approximately 40 per cent butene to produce butadiene is shown together with the operating conditions in Table III.

TABLE III

*Dehydrogenation of butane-butene mixture to butadiene*

| | Run No. | | | |
|---|---|---|---|---|
| | 10 | 11 | 12 | 13 |
| | Catalyst | | | |
| | Impregnated | | Improved | |
| | 86% $Al_2O_3$ 12% $Cr_2O_3$ 2% MgO | 92% $Al_2O_3$ 8% $MoO_3$ | 88% $Al_2O_3$ 12% $Cr_2O_3$ | 92% $Al_2O_3$ 8% $MoO_3$ |
| Calcining temp., °C | 700 | 700 | 700 | 700 |
| Process temp., °C | 675 | 675 | 675 | 675 |
| Process pressure, mm. Hg | 80 | 80 | 80 | 80 |
| Gas hourly space velocity | 1,300 | 1,300 | 1,300 | 1,300 |
| Process period, minutes | 30 | 30 | 30 | 30 |
| Yield of butadiene wt., per cent: | | | | |
| Once through | 23 | 24 | 25.5 | 27 |
| Ultimate yield based on recycle | 76 | 68 | 84 | 86 |
| Carbon, weight, per cent | 2.34 | 1.96 | 1.4 | 1.32 |

The data show that there is a substantial improvement in the amount of butadiene produced both on a once-through and on a recycle basis when using the improved catalysts. Furthermore, less carbon is formed in the case of the improved catalysts than in the case of the impregnated catalysts. The advantages of such an operation are apparent both from the standpoint of conversion and plant costs.

Furthermore, the improved catalysts retain their activity for a much longer time than in the case of the impregnated catalysts. At a point at which the impregnated catalysts drop in activity so that a once-through yield of about 12 per cent of butadiene is obtained the operation with the improved catalysts produces more than 20 per cent per pass.

EXAMPLE IV

Paraffin hydrocarbons containing at least 6 carbon atoms may be converted in accordance with the invention into aromatics by treatment with catalysts of the character described. For this purpose the catalysts comprising alumina in association with difficultly reducible oxides having more than one valence state are suitable. Oxides of elements selected from the left hand columns of groups IV, V and VI are especially useful. Of the preferred individual components associated with alumina, the oxides of molybdenum, chromium, vanadium, tungsten, and cerium are examples.

Table IV illustrates comparative results when a n-heptane fraction obtained by distillation of mineral oil is cyclicized with the improved catalysts of our process and catalysts produced by impregnation of activated alumina under average operating conditions as shown in the table.

TABLE IV
*Cyclization of heptane*

| | Run No. | | | |
|---|---|---|---|---|
| | 14 | 15 | 16 | 17 |
| | Catalyst | | | |
| | Impregnated | | Improved | |
| | 86% Al$_2$O$_3$—12% Cr$_2$O$_3$—2% MgO | 97% Al$_2$O$_3$—3% MoO$_3$ | 88% Al$_2$O$_3$—12% Cr$_2$O$_3$ | 97% Al$_2$O$_3$—3% MoO$_3$ |
| Calcining temp., °C | 600 | 600 | 700 | 700 |
| Processing conditions: | | | | |
| Temp., °C | 550 | 550 | 550 | 550 |
| Pressure, atm | 1 | 1 | 1 | 1 |
| Liquid hourly space velocity | 0.5 | 0.5 | 0.5 | 0.5 |
| Process period, hours | 4 | 4 | 4 | 4 |
| Yields, wt. per cent charge: | | | | |
| Liquid recovery | 73 | 78 | 74 | 72 |
| Aromatics [1] | 43 | 25 | 65 | 62 |
| Carbon | 2.2 | 3.05 | 1.3 | 1.5 |

[1] Largely toluene.

The results in the table show that the operation according to the invention is substantially superior both as to yields of aromatic hydrocarbons and to total liquid recovery. Furthermore, although the yield of aromatic hydrocarbons is substantially better when using the improved catalysts than with the use of the impregnated catalysts the actual amount of carbon formed is substantially less. Because of the relatively high temperature used in cyclization it is desirable to use a catalyst having a good stability over extended periods of processing and regeneration, an advantage realized in the case of our improved catalyst.

EXAMPLE V

Naphthenic hydrocarbons containing 6 membered rings may be dehydrogenated to produce aromatic hydrocarbons by means of catalysts similar to those described in Example IV. In addition to these catalysts, however, another type of composite catalyst is useful, namely catalysts consisting of associations of alumina with metals or compounds of metals of group VIII of the periodic table prepared in the manner herein described. Of these, composite catalysts containing nickel, cobalt, iron in the metallic form or in the form of oxides or sulfides are typical. Catalysts containing mixtures of metals and oxides; metals and sulfides; or oxides and sulfides are useful.

Ordinarily this type of catalyst containing metals of group VIII in free and/or combined form is not practical for the dehydrogenation of aliphatic hydrocarbons or cyclization of aliphatic hydrocarbons for the reason that these catalysts tend to cause excessive decomposition of the hydrocarbons into gas and carbon.

A catalyst is prepared according to our procedure by making a solution of aluminum chloride and cobalt nitrate. Ammonium hydroxide is added until the solution is decidedly basic. The alumina at this point is in the form of hydrated oxide. The cobalt compound remains in solution as an ammonium complex. The solution is then evaporated and the composite mass heated to drive off the ammonium chloride which requires a temperature of about 300° C. Thereafter the mass is heated at 300° C. with hydrogen until a substantial amount of metallic cobalt is formed. When this catalyst is used for dehydrogenating cyclohexane to benzene at a temperature of about 325° C., a yield of about 10 per cent more benzene per pass is obtained than when using an alumina-cobalt catalyst of substantially identical chemical composition but made by impregnating activated alumina with cobalt nitrate, drying, and reducing with hydrogen under comparable conditions.

A similar catalyst may be made from nickel chloride solution instead of cobalt nitrate. In this case the yield of toluene from dehydrogenation of methylcyclohexane with the improved catalyst at 350° C. is about 12 per cent higher per pass than with an impregnated catalyst of similar composition.

EXAMPLE VI

Our invention may be applied to the dehydrogenation of paraffins to mono-olefins and particularly to the dehydrogenation of those paraffins hydrocarbons containing less than 6 carbon atoms in the molecule. Of these, the dehydrogenation of butanes is the most important at this time.

While the following data are obtained with processing periods of 45 minutes, the operation may in general be effected with processing periods of 0.5 to 10 hours and even longer. The treatment of the paraffin hydrocarbon is preferably effected under just sufficiently superatmospheric pressure to assure flow through the system without the use of vacuum pumps. The presence of steam during the processing is generally undesirable. The exact conditions chosen for any paraffin or mixture of paraffins will depend primarily upon the catalyst and the hydrocarbon undergoing conversion.

Results obtained in the treatment of n-butane are shown in the following Table V.

TABLE V

*Dehydrogenation of n-butane to butene*

| | Run No. | | | |
|---|---|---|---|---|
| | 18 | 19 | 20 | 21 |
| | Catalyst | | | |
| | Impregnated | | Improved | |
| | 90% $Al_2O_3$— 10% $Cr_2O_3$ | 96% $Al_2O_3$— 4% $MoO_3$ | 90% $Al_2O_3$— 10% $Cr_2O_3$ | 96% $Al_2O_3$— 4% $MoO_3$ |
| Processing conditions: | | | | |
| Temp., °C | 600 | 600 | 600 | 600 |
| Pressure, atm | 1.2 | 1.2 | 1.2 | 1.2 |
| Gas space velocity | 1,500 | 1,500 | 2,000 | 2,000 |
| Process period, minutes | 45 | 45 | 45 | 45 |
| Conversion, mol per cent butene per pass | 25.7 | 10.5 | 26.5 | 18 |
| Carbon, weight per cent | [1] 0.6 | | [1] 0.5 | |

[1] On catalyst after 300 processing cycles.

The data in Table V illustrate the attainment of relatively higher yields of butene per pass with each of the improved catalysts relative to the corresponding impregnated catalysts in conjunction with a substantially higher permissible gas space velocity, resulting in an increased butane dehydrogenation capacity for a plant of given catalyst capacity.

The character of the present invention and the type of results obtainable by its use are evident from the preceding specification and examples but neither is intended to impose undue limitations upon the scope of the invention.

We claim as our invention:

1. A process for the dehydrogenation of organic materials which comprises contacting a dehydrogenatable organic material under dehydrogenating conditions with a catalyst composite comprising alumina and at least one other catalytically active substance, said composite having been prepared by adding a precipitant for hydrated alumina to a solution of an aluminum salt and a compound constituting the source of the other catalytically active substance, said compound being soluble in the solvent of said solution in the presence of hydrated alumina and the added precipitant, precipitating hydrated alumina from the solution under conditions regulated to maintain substantially all of said compound soluble in said solvent, heating the precipitated alumina together with substantially all of said solvent and said compound soluble therein sufficiently to evaporate the solvent and to leave a residual solid material comprising alumina and said compound, and heating said residual material to develop said catalytically active substance on the alumina.

2. A process for the dehydrogenation of organic materials which comprises contacting a dehydrogenatable organic material under dehydrogenating conditions with a catalyst composite comprising alumina and at least one other catalytically active metal oxide, said composite having been prepared by adding a precipitant for hydrated alumina to a solution of an aluminum salt and a compound which is convertible to said metal oxide on heating thereof, said compound being soluble in the solvent of said solution in the presence of hydrated alumina and the added precipitant, precipitating hydrated alumina from the solution under conditions regulated to maintain substantially all of said compound soluble in said solvent, heating the precipitated alumina together with substantially all of said solvent and said compound soluble therein sufficiently to evaporate the solvent and to leave a residual solid material comprising alumina and said compound, and heating said residual material sufficiently to convert said compound to said catalytically active metal oxide.

3. A process for the dehydrogenation of organic materials which comprises contacting a dehydrogenatable organic material under dehydrogenating conditions with a catalyst composite comprising alumina and at least one other difficultly reducible metal oxide possessing catalytic properties, said composite having been prepared by adding a volatile basic precipitant to a solution of aluminum salt of a volatilizable acid and a compound which is convertible to said metal oxide on heating thereof, said compound being soluble in the solvent of said solution in the presence of hydrated alumina and the added precipitant, precipitating hydrated alumina from the solution under conditions regulated to maintain substantially all of said compound soluble in said solvent, heating the precipitated alumina together with substantially all of said solvent and said compound soluble therein sufficiently to evaporate the solvent and to leave a residual solid material comprising alumina and said compound, and heating said residual material sufficiently to expel volatiles therefrom and to convert said compound to said metal oxide.

4. The process as defined in claim 2 further characterized in that said metal oxide is molybdena and said compound is a molybdenum compound.

5. The process as defined in claim 2 further charaterized in that said metal oxide is chromia and said compound is a chromium compound.

6. The process as defined in claim 2 further characterized in that said metal oxide is vanadia and said compound is a vanadium compound.

7. A process for improving the antiknock value of hydrocarbon distillates boiling in the gasoline range which comprises contacting the distillate under reforming conditions with a catalyst composite comprising alumina and at least one other catalytically active substance, said composite having been prepared by adding a precipitant for hydrated alumina to a solution of an aluminum salt and a compound constituting the source of the other catalytically active substance, said compound being soluble in the solvent of said solution in the presence of hydrated alumina and the added precipitant, precipitating hydrated alumina from the solution under conditions regulated to maintain substantially all of said compound soluble in said solvent, heating the precipitated alumina together with substantially all of said solvent and said compound soluble therein sufficiently to evaporate the solvent and to leave a residual solid material comprising alumina and said compound, and heating said residual material to develop said catalytically active substance on the alumina.

8. A process for the dehydrogenation of aliphatic hydrocarbons which comprises contacting the aliphatic hydrocarbon under dehydrogenating conditions with a catalyst composite comprising alumina and at least one other catalytically active substance, said composite having been prepared by adding a precipitant for hydrated alumina to a solution of an aluminum salt and a compound constituting the source of the other catalytically active substance, said compound being soluble in the solvent of said solution in the presence of hydrated alumina and the added precipitant, precipitating hydrated alumina from the solution under conditions regulated to maintain substantially all of said compound soluble in said solvent, heating the precipitated alumina together with substantially all of said solvent and said compound soluble therein sufficiently to evaporate the solvent and to leave a residual solid material comprising alumina and said compound, and heating said residual material to develop said catalytically active substance on the alumina.

9. The process as defined in claim 7 further characterized in that said compound is a salt of molybdic acid.

10. The process as defined in claim 8 further characterized in that said compound is a salt of molybdic acid.

11. The process as defined in claim 1 further characterized in that said compound is a salt of molybdic acid.

12. The process as defined in claim 1 further characterized in that said compound is a salt of vanadic acid.

13. The process as defined in claim 2 further characterized in that said compound is a salt of molybdic acid, said salt being converted to molybdenum oxide during the last-mentioned heating step.

14. The process as defined in claim 2 further characterized in that said compound is a salt of vanadic acid, said salt being converted to vanadium oxide during the last-mentioned heating step.

15. A process for the dehydrogenation of organic materials which comprises contacting a dehydrogenatable organic material under dehydrogenating conditions with an alumina-molybdena composite, said composite having been prepared by forming a solution of an aluminum salt and ammonium molybdate, precipitating hydrated alumina from said solution under conditions such as to maintain the ammonium molybdate soluble in the solvent of said solution, heating the solution of ammonium molybdate containing the precipitated alumina sufficiently to evaporate the solvent and to leave a residual solid material comprising alumina and ammonium molybdate, and heating said residual material sufficiently to convert the ammonium molybdate to molybdenum oxide.

16. A process for the dehydrogenation of organic materials which comprises contacting a dehydrogenatable organic material under dehydrogenating conditions with an alumina-vanadia composite, said composite having been prepared by forming a solution of an aluminum salt and ammonium vanadate, precipitating hydrated alumina from said solution under conditions such as to maintain the ammonium vanadate soluble in the solvent of said solution, heating the solution of ammonium vanadate containing the precipitated alumina sufficiently to evaporate the solvent and to leave a residual solid material comprising alumina and ammonium vanadate, and heating said residual material sufficiently to convert the ammonium vanadate to vanadium oxide.

GLENN M. WEBB.
MARVIN A. SMITH.